United States Patent [19]

Hering

[11] Patent Number: 4,890,449
[45] Date of Patent: Jan. 2, 1990

[54] ATTACHMENT FOR ROUND HAY BALER

[76] Inventor: Walton C. Hering, Rte. #2, Box 33, Lott, Tex. 76656

[21] Appl. No.: 179,249

[22] Filed: Apr. 8, 1988

[51] Int. Cl.$^4$ ............................................. A01D 75/00
[52] U.S. Cl. ....................................................... 56/341
[58] Field of Search ................. 56/DIG. 20, DIG. 24, 56/131, 341, 432

[56] References Cited

U.S. PATENT DOCUMENTS

| | | | |
|---|---|---|---|
| 3,797,215 | 3/1974 | Kopaska | 56/341 |
| 3,979,892 | 9/1976 | Kucera | 56/341 |
| 4,172,355 | 10/1979 | Blanshine | 56/341 |
| 4,182,101 | 1/1980 | Gaeddert et al. | 56/341 |

Primary Examiner—Thuy M. Bui
Attorney, Agent, or Firm—Fleit, Jacobson, Cohn, Price, Holman & Stern

[57] ABSTRACT

An attachment for a round hay baler in the form of a roller provided with plates mounted rigidly thereon in spaced relation along the length of the roller with the roller engaging the inner surface of the belts which form a round hay bale with the plates extending between adjacent belts and along the outer edge of the outermost belts to deflect hay from the area between the belts and preventing loose hay from accumulating interiorly of the belts with the plates forming a guide for the belts to retain them in proper aligned relation to reduce wear and maintain the belts in a proper tracking relation around their guide structures during the formation of a round hay bale.

2 Claims, 2 Drawing Sheets

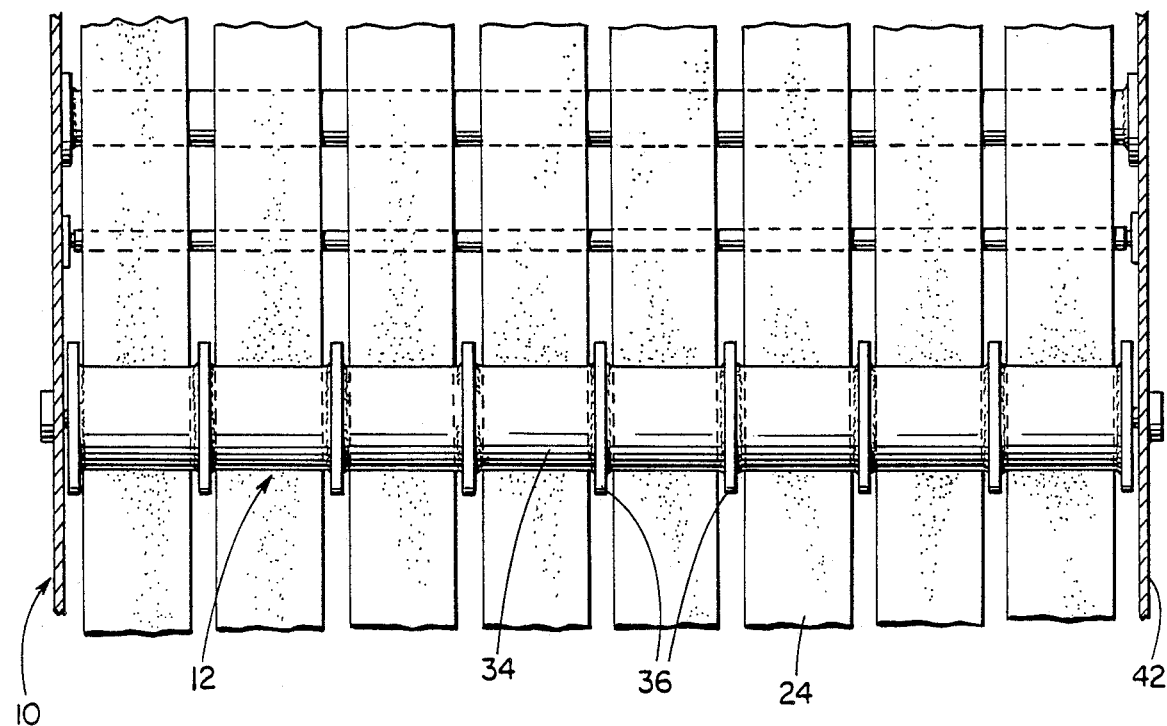
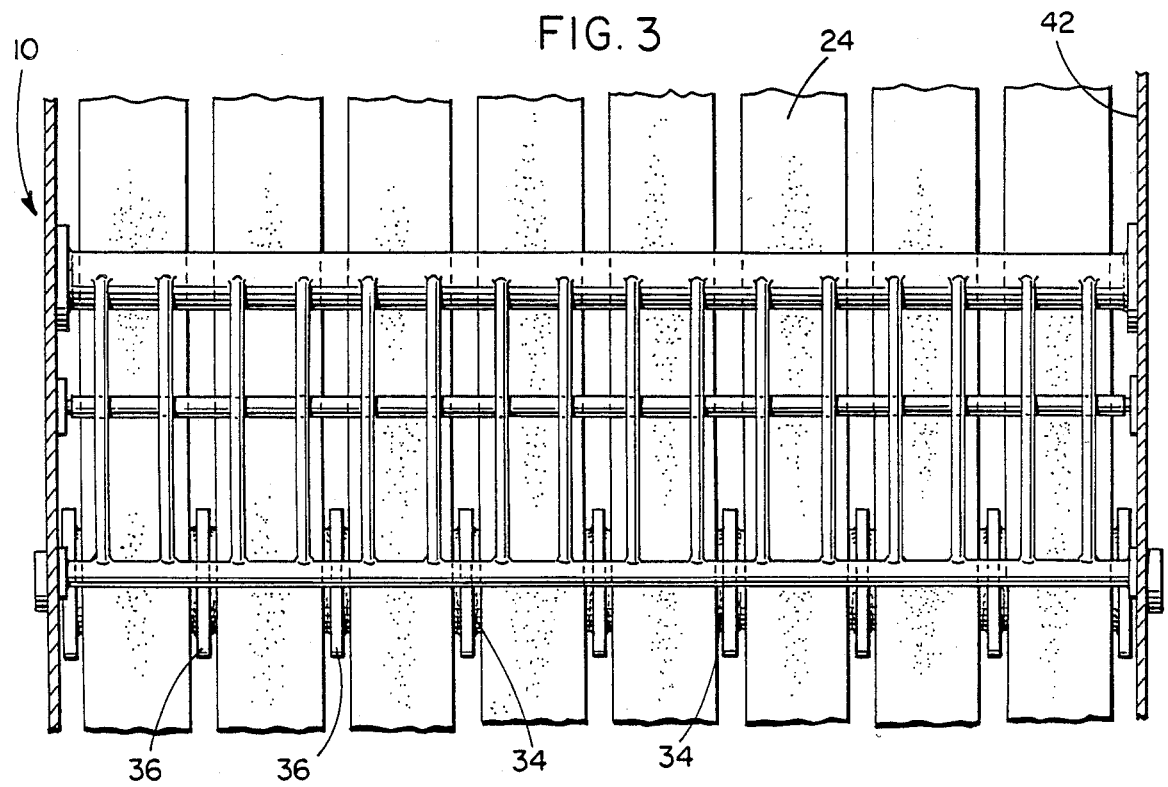

ATTACHMENT FOR ROUND HAY BALER

BACKGROUND OF THE INVENTION

1. FIELD OF THE INVENTION

The present invention generally relates to an attachment for round hay balers and more specifically to a roller provided with plates mounted rigidly thereon in spaced relation along the length of the roller with the roller engaging the inner surface of the belts which form a round hay bale with the plates extending between adjacent belts and along the outer edge of the outermost belts to deflect hay from the area between the belts and preventing loose hay from accumulating interiorly of the belts with the plates forming a guide for the belts to retain them in proper aligned relation to reduce wear and maintain the belts in proper tracking relation around their guide structures during the formation of a round hay bale.

INFORMATION DISCLOSURE STATEMENT

Round hay balers are well known and have been utilized for a number of years. Such balers include a plurality of relatively wide belts which engage and form the round hay bale. The belts are entrained around guide structures and as the size of the round hay bale increases, the path of movement of the belts changes to accommodate the increasing diameter of the hay bale. One problem which has existed in this type of hay baler is the accumulation of loose hay within the interior area defined by the belts as they reverse direction near the front portion of the hay baler. Also, the belts sometimes become displaced laterally during their linear movement due to various factors. To date, there has been no specific structure for alleviating these problems.

SUMMARY OF THE INVENTION

An object of the present invention is to provide a hay baler attachment in the form of a belt guide and hay deflector which includes a roller which engages the interior surface of the plurality of belts which form the hay bale and plates mounted on the roller which deflects hay from the area between and interiorly of the belts and also guides the belts since the plates project between adjacent belts and also engage the outer edge portions of the outermost belts in the round hay baler.

Another object of the invention is to provide an attachment in accordance with the preceding object in which the structure is a rigid cylindrical roller including a plurality of square or polygonal plates rigidly mounted thereon such as by welding with the plates being mutually and equally spaced from each other and being spaced apart a distance to receive the hay bale forming belts therebetween.

A further object of the invention is to provide an attachment for a round hay baler in accordance with the preceding objects in which the roller and plates are rigid, long-lasting and easy to assemble on existing round hay balers and easy to incorporate into new hay balers.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 2 is an elevational view of the attachment of the present invention illustrating its relationship to the bale forming belts as observed from interiorly of the belts.

FIG. 3 is a fragmental front view of the hay baler with portions in section and illustrating the relationship of the roller and of the present invention to the belts.

DESCRIPTION OF THE PREFERRED EMBODIMENT

Figure 1:
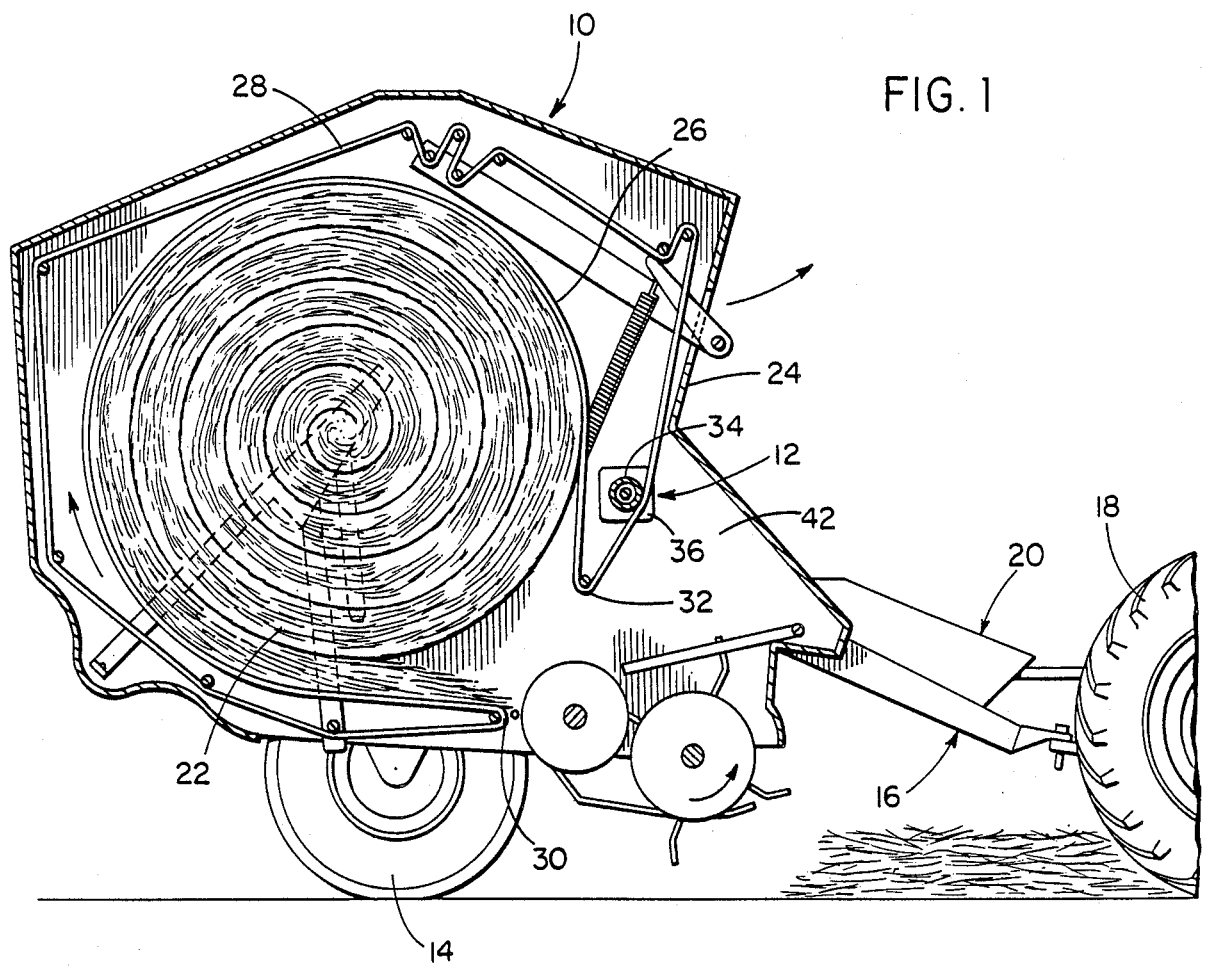
FIG. 1 is a schematic side elevational view of a round hay baler with portions shown in section to illustrate the position of the attachment of the present invention in the hay baler.
Figure 4:
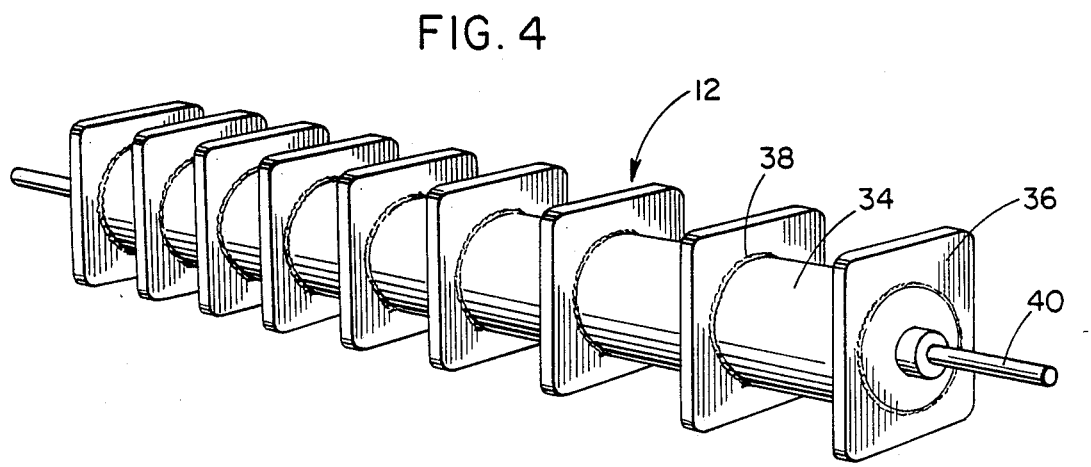
FIG. 4 is a perspective view of the attachment.

Referring now specifically to the drawings, a round hay baler is illustrated in FIGS. 1 and 3 and is designated by reference numeral 10. The hay baler itself is conventional and the attachment of the present invention as generally designated by the numeral 12 can be used with various models of round hay balers. In one embodiment of this invention, a Vermeer model 605J has been provided with the attachment of the present invention and has properly functioned in a manner described hereinafter.

As indicated, the baler 10 is of conventional construction and includes supporting wheels 14 and a hitch structure 16 for connection with a tractor 18 and a drive assembly 20 is provided to drive the hay baler components. As indicated, a round hay bale 22 is formed by wrapping the hay in a spiral manner by the use of a plurality of relatively wide, flat belts 24 which move in a path in engagement with the exterior of the hay bale as indicated by numeral 26 and also move in a reverse direction spaced from the hay bale as indicated by numeral 28 with the belts reversing at the lower front 30 and at the upper front 32 in a conventional and well-known manner with the upper front portion of the baler 10 being elevated and pivoted upwardly as the diameter of the hay bale 22 increases. The structure and operation of the hay baler 10 is well-known and is not altered by the addition of the attachment 12 of the present invention to existing hay balers.

The attachment 12 includes an elongated cylindrical roller 34 which has a plurality of square plates 36 rigidly affixed thereto in equally spaced relation along the longitudinal length of the roller 34. The metal plates 36 may be secured to the metal roller 34 by welding 38 or by other means and the ends of the roller 34 are closed by the end plates and are provided with axially extending shafts 40 at the ends thereof for rotatably journaling the roller 34 from the side walls or frames 42 of the baler with suitable bearing structures and lubrication features being incorporated for enabling the roller 34 to rotate due to its contact with the interior of the upwardly moving belts 24 at the forward portion of the baler 10 as illustrated in FIG. 1.

In the embodiment illustrated, the roller 34 has a diameter of approximately 6" and the plates 36 are preferably 9" square and spaced apart so that the edges of the plates 36 will project between and forwardly of adjacent belts 24. The endmost plates 36 are positioned alongside the outermost belts 24 so that the plates 36 serve as belt guides. Also, all of the plates 36 serve as loose hay deflectors to prevent entry of hay between the belts and to eject any hay that may fall between the belts 24 thereby eliminating any accumulation of loose hay interiorly of the belts 24.

The attachment is rotated or turned by the engagement of the roller 34 with the interior surface of the relatively wide flat belts 24. As the roller is turned, the periphery of the plates extend between adjacent belts with the endmost plates being positioned alongside the outer edges of the outermost belts with the plates serving as belt guides and also serving to deflect loose hay from between the belts. The guiding action increases the belt life and the elimination of hay between the belts and behind the belts enables the belts to more effectively function when forming the hay bale and the elimination of loose hay interiorly of the belts eliminates movement of hay between the belts and their guide and support structures as they travel over guide rollers and the like so that the belts will track in a more precise path. The dimensions of the roller and the number and spacing of the plates may vary depending upon the requirements of each particular hay baler. Also, the dimensional characteristics of the roller and the plates may vary depending upon the model of hay baler the attachment is to be used with. By utilizing the attachment, the hay baler will more effectively and efficiently form a round hay bale and the belts will have a longer life expectancy.

The foregoing is considered as illustrative only of the principles of the invention. Further since numerous modifications and changes will readily occur to those skilled in the art, it is not desired to limit the invention to the exact construction and operation shown and described, and, accordingly, all suitable modifications and equivalents may be resorted to, falling within the scope of the invention.

What is claimed as new is as follows:

1. An attachment for a round hay baler in which the hay baler includes a plurality of relatively wide hay bale forming belts including outermost belts, each of said belts having a hay bale engaging surface and a surface opposite thereto, said attachment comprising an elongated generally cylindrical roller, said roller being journaled from the baler with the roller engaging and being rotatably driven by contact with the belt surfaces opposite to the belt surfaces engaging the hay bale and a plurality of polygonal plates rigidly fixed to said roller in mutually spaced relation throughout the length thereof and including a plurality of intermediate plates and two endmost plates, said intermediate plates projecting between adjacent belts for deflecting hay from between the belts and deflecting loose hay from the interior portions of the belts and guiding the belts, said endmost plates positioned alongside the side edges of the outermost belts, each end of said roller including an axial shaft projecting therefrom for journaling from the hay baler in spaced relation to all guide and drive rollers on the hay baler.

2. In combination, a round hay baler having side wall portions and including a plurality of spaced, wide, flat belts being driven and having an exterior surface engaging the exterior surface of a round hay bale and entrained over direction reversing means at the upper front end thereof and belt guide means spaced therefrom, an attachment comprising an elongated generally cylindrical roller, said roller being journaled from the baler with the roller engaging and being rotatably driven solely by contact with the belt surfaces opposite to the belt surfaces engaging the hay bale and a plurality of polygonal plates rigidly fixed to said roller in mutually spaced relation throughout the length thereof for deflecting hay from between the belts, deflecting loose hay from the interior portions of the belts and guiding the belts, said plates including intermediate plates projecting between adjacent belts and two endmost plates positioning alongside the side edges of the outermost belts, each end of said roller including an axial shaft projecting therefrom for journaling in side wall portions of the hay baler, said roller being spaced from but adjacent to direction reversing means at the upper front end of the baler and spaced from said belt guide means.

* * * * *